United States Patent
Paielli

(12) 
(10) Patent No.: US 6,461,267 B1
(45) Date of Patent: Oct. 8, 2002

(54) ELECTRONICALLY CONTROLLED AXLE ASSEMBLY

(75) Inventor: Perry Paielli, Brighton, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/771,683

(22) Filed: Jan. 30, 2001

(51) Int. Cl.[7] ............ F16D 27/00; F16H 1/44; F16H 48/30

(52) U.S. Cl. ............ 475/150; 475/233; 475/86; 475/230; 475/231

(58) Field of Search ............ 475/150, 86, 88, 475/230, 231, 233, 249, 89, 90; 192/35, 103 F, 85 AA, 84.1, 84.91; 180/233, 249, 197, 248, 250; 701/89, 88, 87; 74/640, 650

(56) References Cited

U.S. PATENT DOCUMENTS

| | | |
|---|---|---|
| 3,131,582 A | 5/1964 | Kelbel |
| 4,186,829 A | 2/1980 | Schneider et al. |
| 4,679,463 A | 7/1987 | Ozaki et al. |
| 4,739,865 A | 4/1988 | Yater et al. |
| 4,781,078 A * | 11/1988 | Blessing et al. |
| 4,860,862 A | 8/1989 | Yater et al. |
| 5,030,181 A * | 7/1991 | Keller .................. 475/150 |
| 5,215,506 A * | 6/1993 | Hara .................. 475/86 |
| 5,299,986 A | 4/1994 | Fabris et al. |
| 5,322,484 A | 6/1994 | Reuter |
| 5,804,935 A * | 9/1998 | Radev |
| 5,879,259 A | 3/1999 | Teraoka et al. |
| 5,911,643 A * | 6/1999 | Godlew et al. .............. 475/150 |
| 5,950,750 A * | 9/1999 | Dong et al. |
| 5,989,147 A * | 11/1999 | Forrest et al. .............. 475/231 |
| 6,083,134 A * | 7/2000 | Godlew .................. 475/150 |
| 6,309,320 B1 * | 10/2001 | Forrest et al. .............. 475/150 |
| 2001/0041637 A1 * | 11/2001 | Leeper .................. 475/85 |
| 2001/0044355 A1 * | 11/2001 | Cheadle et al. .............. 475/150 |

* cited by examiner

Primary Examiner—Douglas C. Butler
(74) Attorney, Agent, or Firm—Liniak, Berenato, Longacre & White

(57) ABSTRACT

An electronically controlled axle assembly having an electronically controllable valve secured to the differential case to control pressure within a hydraulically actuated clutch pack there within. The clutch pack operates to selectively couple a pair of shafts.

11 Claims, 3 Drawing Sheets

ELECTRONICALLY CONTROLLED AXLE ASSEMBLY

BACKGROUND OF THE INVENTION

1. Field of the Invention

This invention relates to electronic control of an axle assembly for use with a vehicle drive train, for example, a torque-coupling device; and more particularly is directed an electronically controlled actuator directly connected to the differential case to control a clutch in such an axle assembly.

2. Background of Related Art

Limited slip differentials, or torque coupling devices are well known in the art. In such limited slip devices, a hydraulically actuated friction clutch pack is actuated to retard relative rotation of at least one of the output shafts relative to the differential case. Normally, hydraulic pressure is directly increased in response to an increase in rotational speed differential of the output shafts or when a specific output shaft exceeds a predetermined limit. One common way to provide the hydraulic pressure is to include an internal pump, or gerotor pump, within the differential case which increases a clutch action on one shaft as the rotational speed increases. However, these prior art devices do not provide the ability to selectively control the pressure in the clutch pack and consequently the amount of limited slip or selective torque transfer. Other devices provide a controlled pump external to the differential housing and required complicated and costly hydraulic rotatable interfaces between the housing and differential case. An object of the present invention is to overcome the drawbacks of the prior art devices.

SUMMARY OF THE INVENTION

The present invention provides electronic control of a differential assembly. An electronically controlled solenoid valve is formed on the external surface of the differential case and is connected to a passageway leading to a clutch pack within the differential case to establish fluid communication there between. The clutch pack is arranged to selectively couple one of the output shafts with either the differential case or the other output shaft. A pump is provided within the differential case to force the clutch to couple the output shaft as previously noted. The solenoid valve is electronically controlled to selectively relieve pressure within the differential case and clutch assembly to selectively control coupling of the output shaft.

The objects, features and advantages of the present invention are readily apparent from the following detailed description of the best modes for carrying out the invention when taken in connection with the accompanying drawings.

DETAILED DESCRIPTION OF PREFERRED EMBODIMENTS

Figure 1:
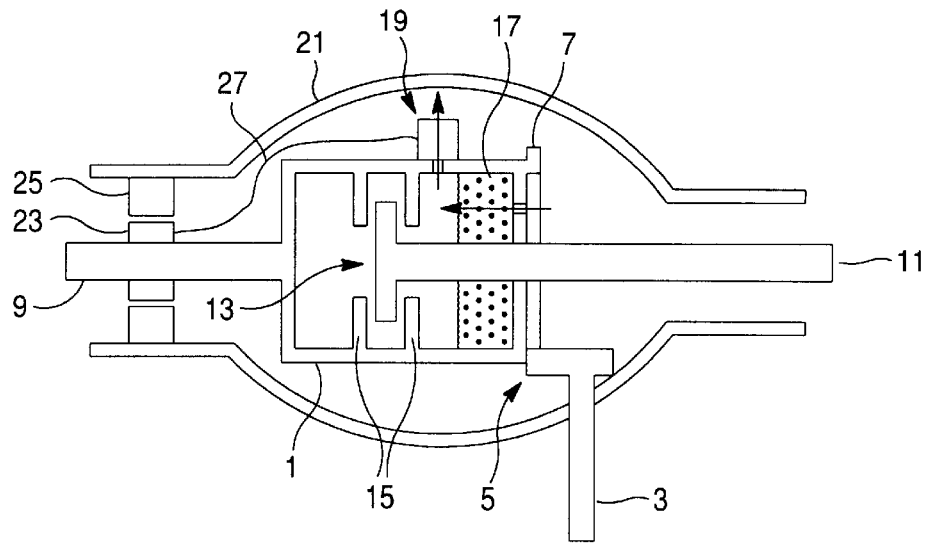
FIG. 1 is a schematic section view of a differential assembly employing the electronic control device according to the present invention.

FIG. 1 is a schematic view an axle assembly employing an electronically controlled clutch. A coupling housing or differential case 1 is driven by an input drive shaft 3 via a pinion gear 5 and ring gear 7 interface as is known in the art. In the present embodiment a drive axle shaft 9 is positively secured to the differential case 1 for rotation therewith. Consequently the drive axle shaft 9 will rotate at a speed proportional to the ring gear/pinion gear ratio in relation to the speed of the input drive shaft. A second output shaft or following axle shaft 11 is selectively coupled to the differential case 1.

An axle clutch plate 13 is secured to the following axle shaft 11 and disposed within a clutch assembly within the coupling housing 1. The clutch assembly preferably includes a set of coupler clutch plates 15 at least one of which is moveably secured to the inner portion of the coupling housing 1 such as by a splined interface. A hydraulic pump 17 is disposed within the coupling housing to supply pressurized fluid to the clutch assembly. As fluid pressure is increased within the coupling housing 1, the coupler clutch plates are forced together to engage the clutch plate 13 of the following axle shaft 11. Thus a driving connection is established between the following axle shaft 11 and the drive axle shaft 9 and therefore the input drive shaft 3. Regulation of the fluid pressure within the coupling housing 1 thus will control the engagement of the clutch assembly and thus the connection of the following axle shaft 11.

To control the pressure within coupling housing 1 and hydraulic clutch, an electronically controllable valve 19 is provided to selectively release pressurized fluid to within housing 21. When it is desired to decouple the following axle shaft 11, the valve 19 remains open to release an increase in hydraulic pressure within the clutch assembly. Closing the valve 19 will result in an increase in internal pressure and thus the clutch assembly will close and engage the axle clutch plate 13 establishing a driving contact. Intermittent selective control of the valve 19 may also be used to partially establish a driving connection to the.following axle shaft 11 and thus allow slip.

Preferably, the control valve 19 is a solenoid activated valve. In order to open or close the solenoid valve, a voltage must be controllably supplied to the valve to selectively open and close the valve. In the preferred embodiment a rotor and stator are employed to deliver electrical energy to the valve 19. A rotor 23 is fixed to the drive axle shaft 9 and rotatable therewith. A stator 25 is attached to the differential/coupling housing 21 and disposed about the rotor 23. By selectively delivering current through the stator, as the drive axle shaft 9 and rotor rotate, a current is induced through the rotor 23. The electrical current through the rotor is simply conducted to the valve 19 via a connecting wire 27. As electrical current is varied in the stator 25, a resulting variation in the magnetic field induces electrical current in the rotor and consequently the valve 19. By simply selectively controlling the current supplied to the stator, the valve 19 may be remotely controlled.

Figure 2:
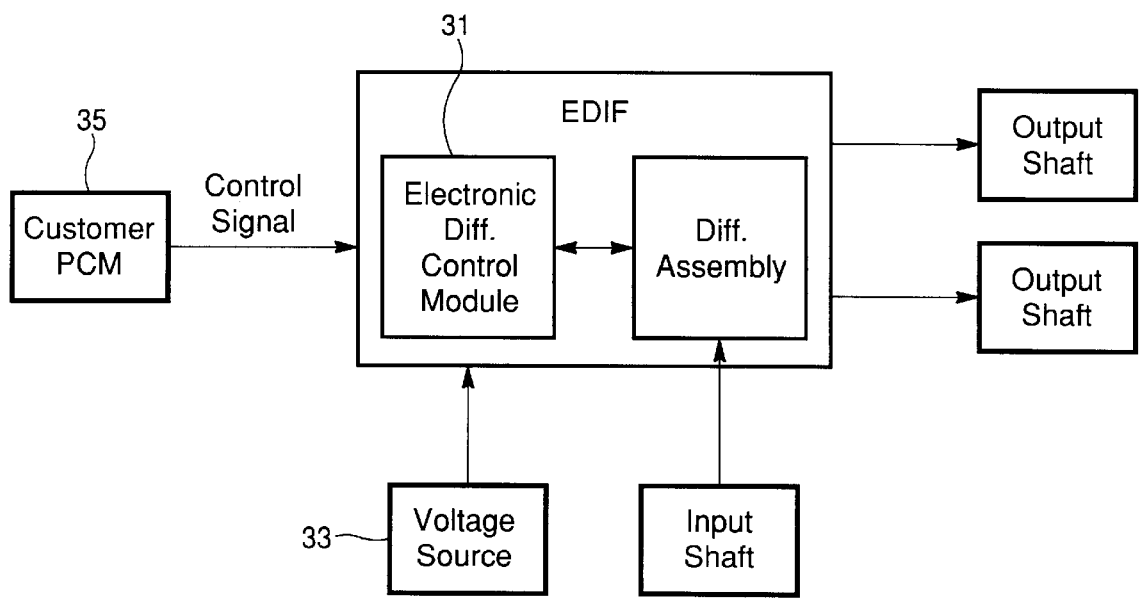
FIG. 2 is a schematic view of the electronically controlled differential assembly and control device according to the present invention.

FIG. 2 is a schematic representation of the control of the present invention. An electronic differential controller 31 is connected to the differential assembly and more particularly to the stator 25. A voltage source 33, such as a vehicle's battery may be simply connected to the differential controller 31. The controller 31 is simply programmed to supply voltage to the stator 25 to appropriately control the valve 19 according to prescribed driving conditions. Thus the differential controller 31 may also interface with a vehicle control module 35 to obtain information relating to driving conditions or serve as an interface to receive specific instructions directly from the vehicle controller 35 to operate the valve 19. For example, where the coupling device of FIG. 1 may be employed as a transfer case to selectively activate a front or rear driving axle, the vehicle controller 35 simply communicates with the differential controller 31 to appropriately supply voltage to the stator 25 and close valve 19. It is noted that it is not necessary to explain the specific details of the stator 25 and rotor 23 as such systems are readily known in the respective arts. So long as electrical energy may be selectively delivered to the valve 19 through a rotatable interface between the housing 21 and coupling housing or differential case 1, the present electrically controlled valve 19 may be employed.

It is also to be understood that specific details of the pump 17 and clutch assembly are not necessary for the understanding and implementation of the present invention. Internal pumps within a differential assembly such as a gerotor pump employed in limited slip differential assemblies are well known in the art. Furthermore, clutch pack assemblies employing splined clutch plates or other arrangements are also well known in the art and may so be employed in the present invention. Any hydraulically actuated clutch that may be controlled by regulating the internal fluid pressure may be employed. Such devices are within the knowledge of one of ordinary skill in the art and construction of the present invention readily apparent with reference to the generic structure and features of the clutch and pump assembly. Furthermore, the specific structure of the solenoid valve need not be explained in detail as any electronically controlled valve suitable for connection to a rotatable differential case or coupling housing within an axle assembly to control hydraulic pressure within a housing may be employed by the present invention. The structure of such electronically controlled solenoid valves are well within the knowledge of ones of ordinary skill in the art.

Figure 3:
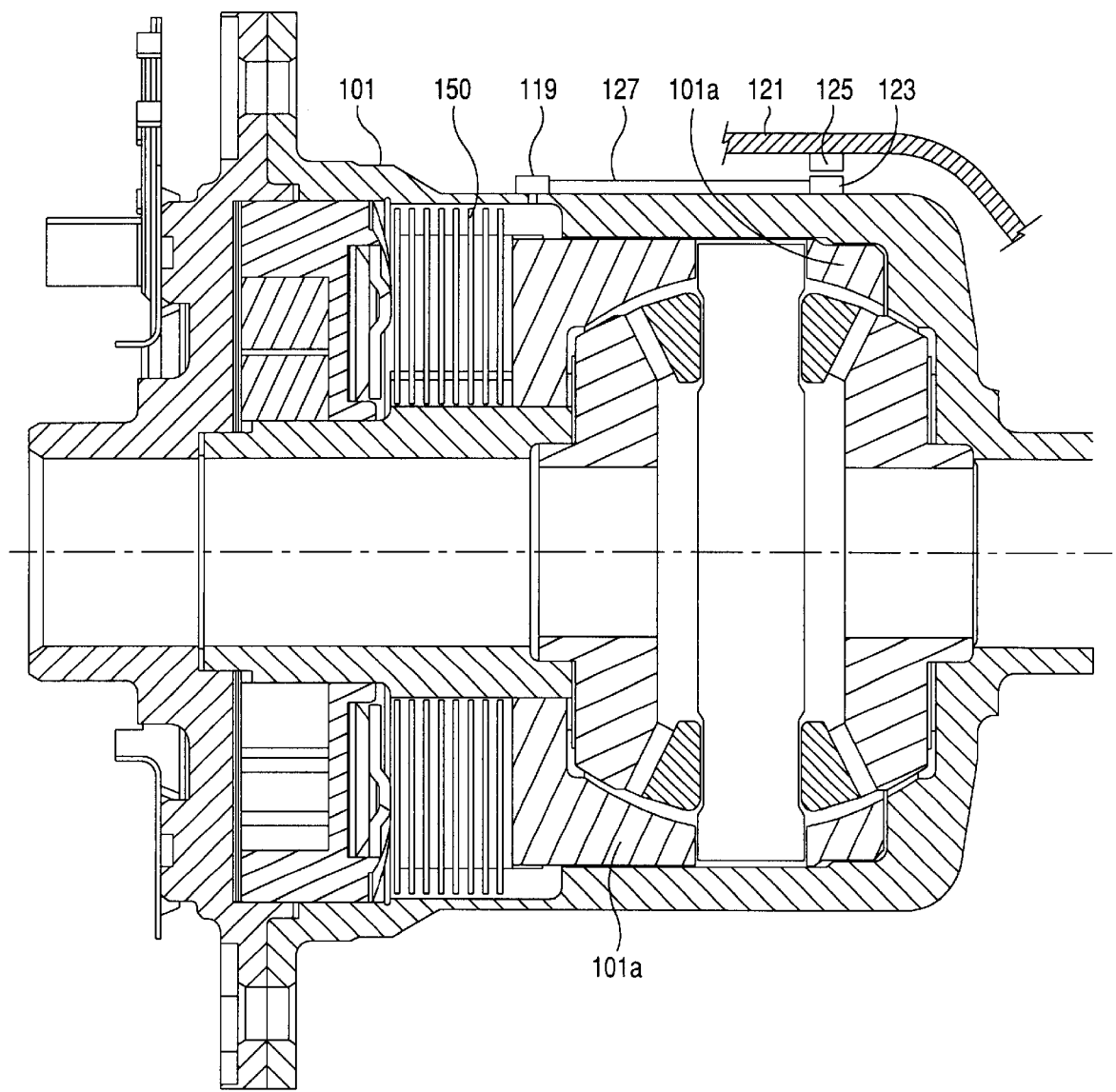
FIG. 3 is a sectional view of a torque coupling differential employing electronic control according to the present invention.

FIG. 3 represents an alternate embodiment of the present invention. In the embodiment of FIG. 3, the valve 119 is employed to control a torque-coupling differential. The torque coupling differential selectively couples an outer case driven by a ring gear interfacing with an input drive gear (not shown) and an internal differential case 101*a*. Such arrangements are employed to selectively activate drive to an axle assembly integrated into a single differential assembly. Such devices are useful in select four wheel drive to a specific drive axle. Such an arrangement facilitates speed sensitive actuation of a drive axle while integrating differential speed rotation between the output shafts. The valve 119 is simply secured to the outer case 101 in fluid communication with the clutch assembly 150. By opening the valve 119 and allowing the clutch 150 to constantly bleed, the inner case 101*a* and outer case 101 are affectively decoupled. Similarly, when the valve 119 is closed, speed sensitive coupling of the inner case 101*a* and the outer case 101 is permitted. Intermittent control is also possible. As in the previous embodiment, a rotor 123 is secured to the outer case 101 and connected to the valve 119 by wire 127. A stator 125 is secured to the inner surface of the housing 121 adjacent and about the rotor 123. Connection to the controller 31 is established as previously described in the previous embodiment.

Figure 4:
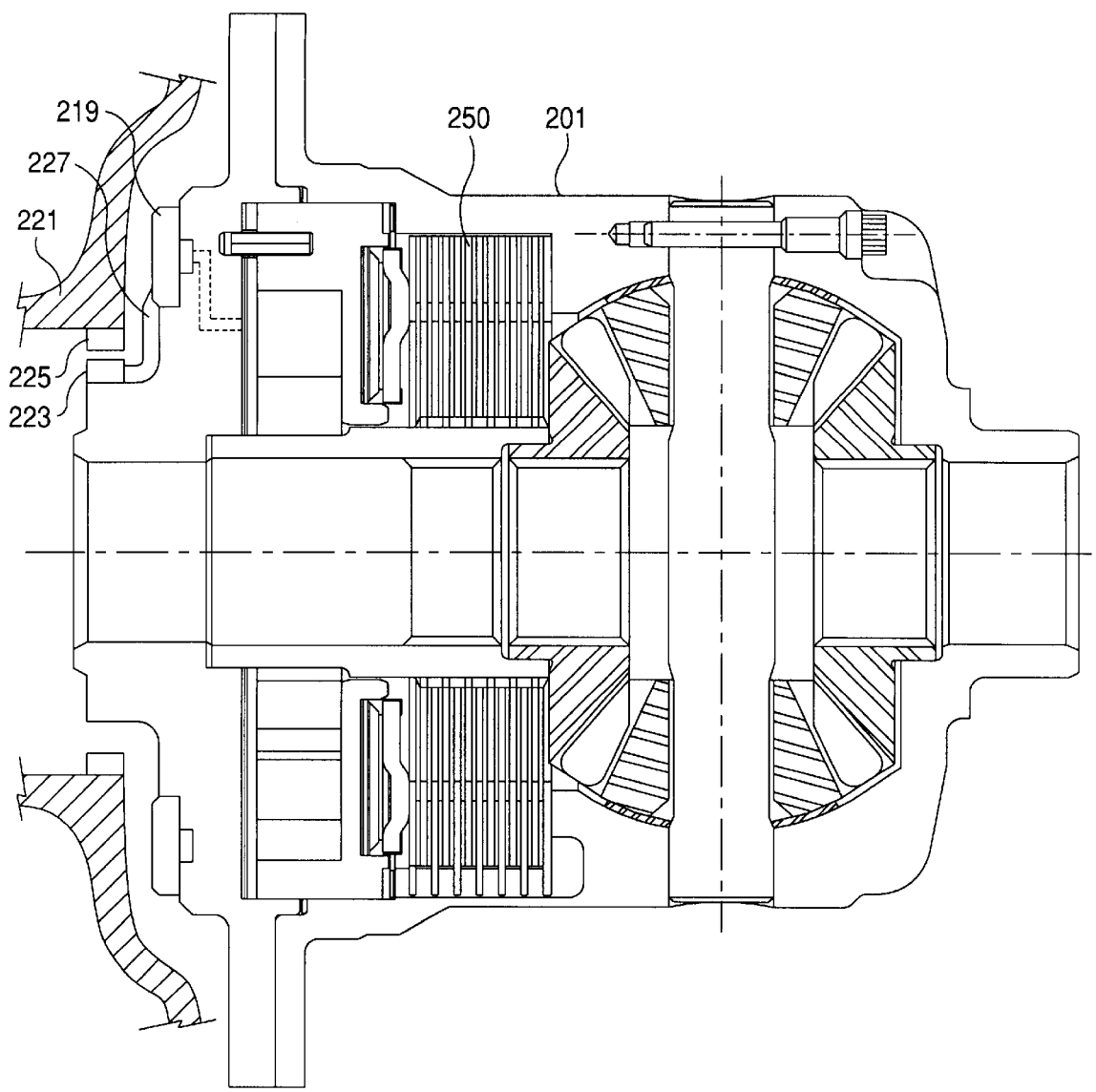
FIG. 4 is a sectional view of an electronically controlled differential according to an alternate embodiment of the present inventions.

FIG. 4 represents an alternative embodiment of the present invention. In this embodiment, the electrically controlled valve 219 is secured to a conventional limited slip differential case 201 and in communication with a hydraulically actuated clutch pack 250 adapted to provide limited slip between a pair of output shafts. The details of the conventional limited slip device will not be explained as such is well known in the art. The control of the valve 219 is very similar to the embodiment shown and described in FIGS. 1 and 3. A rotor 223 is secured to the differential case 201 and rotatable therewith and electrically connected to the valve 219 via a wire 227. A stator 225 is secured to the inner surface of the housing 221 adjacent and about the rotor 223. The stator 225 is connected to the differential controller 31 as in the previous embodiments. In the present embodiment of FIG. 4, the clutch pack 250 may be selectively controlled. Closing valve 250 will permit the differential assembly to operate in a limited slip mode. The clutch device and fluid paths may also be altered to create locking between the output shafts. The valve 50 may also be left open to allow free differential relative rotation between the output shafts. Intermittent control is also possible.

The present invention has been shown and described with reference to specific embodiments forming the best mode, however various changes in form and detail may be made without departing from the spirit and scope of the invention. While the best modes for carrying out the invention have been described in detail, those familiar with the art to which this invention relates will recognize various alternatives, designs and embodiments for practicing the present invention as defined by the following claims. For example, the specific position of the rotor 223, stator 225 and electronically controlled valve 219 may be rearranged to accommodate spacing requirements. The illustrations provided are intended for representative purpose to convey the utility of the present invention. Moreover, although not shown, the differential assembly and axle output shafts are grounded by virtue of subsequent connections through the drive train in each of the previously described embodiments. Thus an electrical loop is established between the voltage source 33, differential controller 31 and axle assembly.

What is claimed is:

1. A differential axle assembly disposed within a housing, said assembly comprising:

a differential case driven by an input shaft and adapted to allow differential rotational speed between a pair of output shafts;

a clutch device disposed between one of said pair of shafts and said differential case for selectively coupling said one of said output shafts to said differential case and thereby the other output shaft; and an electrically controlled actuator directly secured to said differential case, said electrically controlled actuator being connected to and controlling said clutch device to selectively couple said pair of output shafts, wherein said clutch device is a hydraulically actuated clutch disposed within said differential case and said electrically controlled actuator is an electro-magnetically controlled valve in communication with said hydraulically actuated clutch to selectively and controllably relieve pressure in said hydraulically actuated clutch.

2. A The differential assembly according to claim 1, further comprising a control module in communication with said electronically controlled actuator to selectively control said clutch device.

3. A differential assembly disposed within a housing, said assembly comprising:

a differential case driven by an input shaft and adapted to allow differential rotational speed between a pair of output shafts;

a clutch device disposed between one of said pair of shafts and said differential case for selectively coupling said one of said output shafts to said differential case and thereby the other output shaft;

an electrically controlled actuator directly secured to said differential case, said electrically controlled actuator being connected to and controlling said clutch device to selectively couple said pair of output shafts;

a rotor secured to one of, one of said output shafts and said differential case, and electrically coupled to said electrically controlled actuator;

a stator secured to said housing and disposed about said rotor; and a control module in communication with said stator, whereby said control module selectively controls a current through said stator to thereby selectively vary a current to said electrically controlled actuator and thus selectively control said clutch device.

4. The differential assembly according to claim 3, wherein said clutch device is a hydraulically actuated clutch and said actuator is an electro-magnetically controlled valve in communication with said hydraulically actuated clutch to selectively and conrtrollably relieve pressure in said hydraulically actuated clutch.

5. A differential axle assembly comprising:

a differential case rotatably mounted within a housing, said differential case containing a differential gear assembly driven by an input shaft and allowing differential rotational speed between a pair of opposing output shafts;

a hydraulically actuated clutch device disposed within said differential case for selectively coupling one of said pair of opposing output shafts to said differential case; and an electrically controlled valve directly secured to said differential case and rotatable therewith, said electrically controlled valve being in fluid communication with said hydraulically actuated clutch device to selectively control a pressure there within and thereby control said coupling of said pair of opposing output shafts.

6. The differential axle assembly according to claim 5, said assembly further comprising:

a rotor secured to said differential case and electrically coupled to said electrically controlled valve;

a stator disposed about said rotor and secured to said housing;

a control module in communication with said stator, whereby said control module selectively controls a current through said stator to thereby selectively vary a current to said electrically controlled valve and thus selectively control said clutch.

7. The differential axle assembly according to claim 6, wherein said hydraulically actuated clutch device includes an electro-magnetically controlled valve in communication with said hydraulically actuated clutch device to selectively and controllably relieve pressure in said hydraulically actuated clutch device.

8. The differential assembly according to claim 5, wherein said hydraulically actuated clutch device partially retards relative rotation between said one of said pair of opposing output shafts and said differential case thus allowing limited slip therebetween and thereby inhibit differential movement between said pair of opposing output shafts.

9. A torque coupling device disposed between a drive axle shaft and at least one following axle shaft, said torque coupling device disposed within a housing and comprising:

a differential case in driving connection with said drive axle shaft;

a hydraulically actuated clutch device disposed between and connecting said differential case and said at least one following axle shaft to thereby allow selective coupling between said drive axle shaft and said at least one following axle shaft;

an electrically controlled valve directly secured to said differential case and in communication with said hydraulically actuated clutch device to selectively control a pressure in said hydraulically actuated clutch device thereby selectively controlling said coupling between said drive axle shaft and said at least one following axle shaft.

10. The torque coupling device according to claim 9, said assembly further comprising:

a rotor secured to one of said drive axle shaft and said at least one following axle shaft and said differential case and electrically connected to said electrically controlled valve;

a stator disposed about said rotor and secured to said housing;

a control module in communication with said stator, whereby said control module selectively controls a current through said stator to thereby selectively vary a current to said electrically controlled valve and thus selectively control said hydraulically. actuated clutch device.

11. The torque coupling device according to claim 9, further comprising a control-module in communication with said electronically controlled valve to selectively control said hydraulically actuated clutch device.

* * * * *